United States Patent
Schneider

(10) Patent No.: US 7,637,547 B2
(45) Date of Patent: Dec. 29, 2009

(54) PAIR OF SERVING TONGS WHICH CAN BE LOCKED IN A CLOSED POSITION

(75) Inventor: Paul Schneider, Durach (DE)

(73) Assignee: Metallwarenfabrik Marktoberdorf GmbH & Co., KG, Marktoberdorf (DE)

( * ) Notice: Subject to any disclaimer, the term of this patent is extended or adjusted under 35 U.S.C. 154(b) by 0 days.

(21) Appl. No.: 11/842,358

(22) Filed: Aug. 21, 2007

(65) Prior Publication Data
US 2008/0054661 A1  Mar. 6, 2008

(30) Foreign Application Priority Data
Sep. 5, 2006  (DE) .................. 10 2006 041 622

(51) Int. Cl.
*A47G 21/10* (2006.01)
*A47J 42/28* (2006.01)
(52) U.S. Cl. ....................... 294/16; 294/99.2
(58) Field of Classification Search .............. 294/16, 294/3, 28, 99.2; D7/686
See application file for complete search history.

(56) References Cited

U.S. PATENT DOCUMENTS

| | | | |
|---|---|---|---|
| 2,864,645 A | | 12/1958 | Meldrum |
| 5,199,756 A | * | 4/1993 | Bartlett et al. ............ 294/16 |
| 6,056,338 A | | 5/2000 | Kerr |
| 6,092,847 A | * | 7/2000 | Kwan ..................... 294/16 |
| 7,086,676 B2 | * | 8/2006 | Sumter et al. ............ 294/16 |
| 7,261,348 B1 | * | 8/2007 | Fried ...................... 294/16 |
| 2004/0239129 A1 | | 12/2004 | Sumter et al. |
| 2005/0253404 A1 | | 11/2005 | Kerr et al. |

FOREIGN PATENT DOCUMENTS

GB  177367  3/1922

OTHER PUBLICATIONS

European Search Report, Jul. 10, 2008.

* cited by examiner

*Primary Examiner*—Paul T Chin
(74) *Attorney, Agent, or Firm*—Rothwell, Figg, Ernst & Manbeck, P.C.

(57) ABSTRACT

A pair of serving tongs (10) comprises two tong limbs (12, 14) which are connected to each other in a manner such that they can pivot relative to each other about a pivot axis (15) and are designed at their front ends (12a, 14a) for grasping food products, a spring (18) in order to prestress the tong limbs (12, 14) into an open position of the pair of serving tongs (10), and a locking mechanism (20) in order to lock the tong limbs (12, 14) counter to the prestress of the spring (18) in a closed position of the pair of serving tongs (10). In this case, the first tong limb (12) comprises an elongated hole (22) in which a locking pin (24) is moveably guided, and a locking cam (26) is provided on the second tong limb (14) and, in the locked closed position of the pair of serving tongs (10), comes into contact with the locking pin (24). A locking and an unlocking of the tong limbs (12, 14) takes place here by simple pivoting of the pair of serving tongs (10) into an essentially vertical position with the tong limbs close to each other. Furthermore, the locking mechanism (20) is arranged behind the pivot axis (15) of the tong limbs (12, 14), as viewed from a front end (12a, 14a) of the tong limbs (12, 14).

6 Claims, 4 Drawing Sheets

Fig. 5
Fig. 6
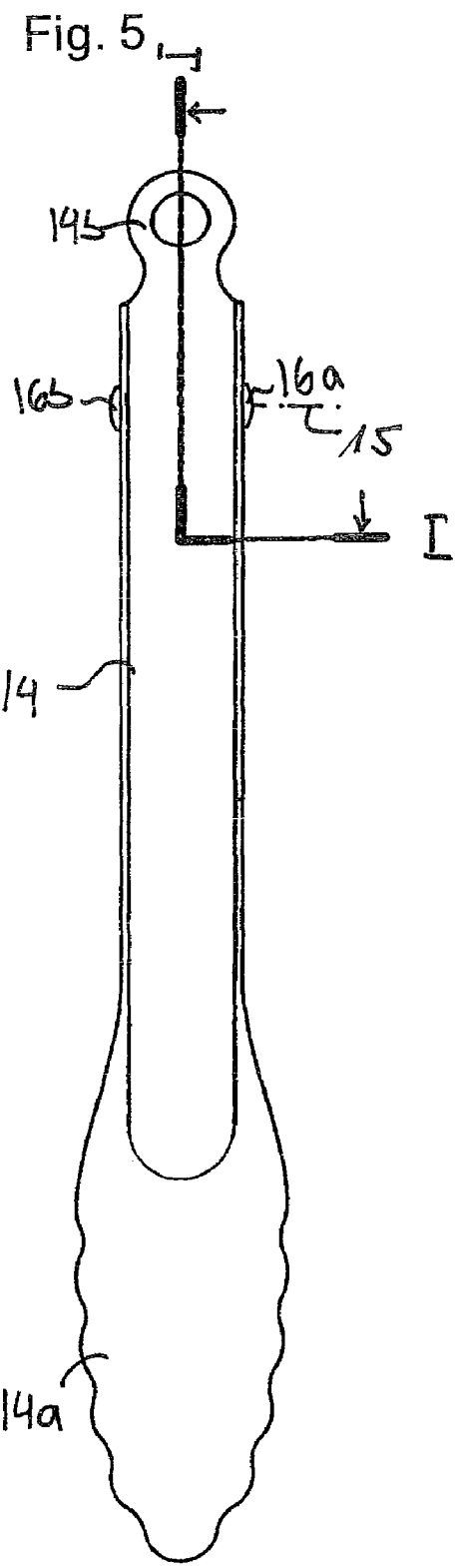
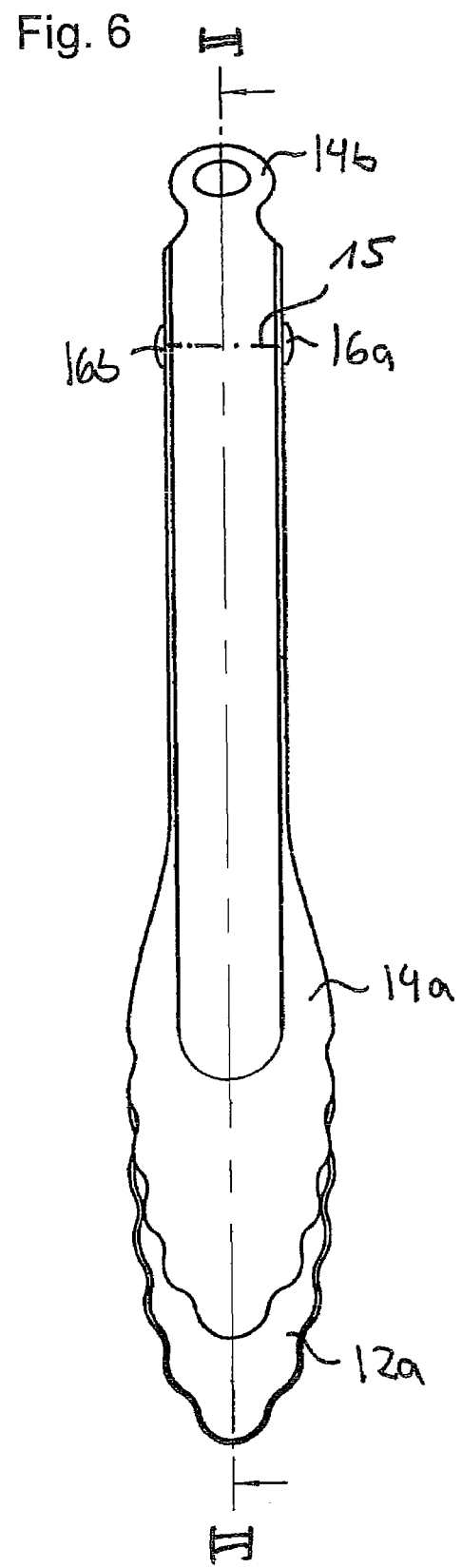

US 7,637,547 B2

PAIR OF SERVING TONGS WHICH CAN BE LOCKED IN A CLOSED POSITION

CROSS REFERENCE TO RELATED APPLICATION

This application claims priority from German patent application No. 10-2006-041622.8 filed Sep. 5, 2006, the disclosure of which is incorporated herein by its entirety.

BACKGROUND OF THE INVENTION

The present invention relates to a pair of serving tongs, comprising two tong limbs which are connected to each other in a manner such that they can pivot relative to each other about a pivot axis and are designed at their front ends for grasping food products, a spring in order to prestress the tong limbs into an open position of the pair of serving tongs, and a locking mechanism in order to lock the tong limbs counter to the prestress of the spring in a closed position of the pair of serving tongs, wherein the first tong limb comprises an elongated hole in which a locking pin is moveably guided, and wherein a locking cam is provided on the second tong limb and, in the locked closed position of the pair of serving tongs, comes into contact with the locking pin, and wherein a locking and an unlocking of the tong limbs takes place by simple pivoting of the pair of serving tongs into an essentially vertical position with the tong limbs close to each other.

A pair of serving tongs of this type, which can be used, for example, in order to serve salad or during the grilling of meat, is known, for example, from U.S. Pat. No. 2,864,645. This known pair of serving tongs has the advantage that it can easily be locked in its closed position and unlocked again by means of a hand movement by the pair of serving tongs, either for locking, being pivoted in such a manner that the front ends of the tong limbs point upwards, or, for unlocking, being pivoted in such a manner that the front ends of the tong limbs point downwards while the tong limbs are simultaneously lightly pressed together.

However, in the case of this known pair of serving tongs, the locking mechanism, comprising the locking pin, the elongated hole and the locking cam, is arranged in front of the pivot axis, as seen from the front ends of the tong limbs, and therefore, during use, for example salad leaves, sauce or salad dressing sprayers or the like may soil the locking mechanism such that, firstly, the locking mechanism has to be awkwardly cleaned and, secondly, the action of the locking mechanism may also be impaired if, for example, the locking pin no longer slides freely in the elongated hole due to soiling.

SUMMARY OF THE INVENTION

It is therefore the object of the present invention to provide a pair of serving tongs of the generic type, the unlocking/locking mechanism of which also functions in a consistently reliable manner during long-term correct use.

To achieve this object, the present invention provides a pair of serving tongs, comprising two tong limbs which are connected to each other in a manner such that they can pivot relative to each other about a pivot axis and are designed at their front ends for grasping food products, a spring in order to prestress the tong limbs into an open position of the pair of serving tongs, and a locking mechanism in order to lock the tong limbs counter to the prestress of the spring in a closed position of the pair of serving tongs, wherein the first tong limb comprises an elongated hole in which a locking pin is moveably guided, and wherein a locking cam is provided on the second tong limb and, in the locked closed position of the pair of serving tongs, comes into contact with the locking pin. A locking and an unlocking of the tong limbs takes place here by simple pivoting of the pair of serving tongs into an essentially vertical position with the tong limbs close to each other. The pair of serving tongs of the present invention is characterized in that the locking mechanism is arranged behind the pivot axis, as viewed from a front end of the tong limbs.

By means of this arrangement of the locking mechanism behind the pivot axis of the tong limbs, the locking mechanism does not normally come into contact with food products during the correct handling of the pair of tongs, and therefore, firstly, complicated cleaning of the locking mechanism after each use can be omitted and, secondly, it is ensured that the locking mechanism functions reliably even if the pair of serving tongs is severely soiled, for example by sauce sprayers or the like in the front gripping region between the tong limbs.

The elongated hole preferably extends essentially parallel to a longitudinal axis of the first tong limb, and therefore the locking or the unlocking of the pair of tongs can reliably take place by pivoting into an essentially vertical position.

The locking position of the locking pin preferably corresponds to a position at the rear end of the elongated hole while the release position of the locking pin corresponds to a position at the front end of the elongated hole. This ensures that, during use of the pair of serving tongs in order to grasp food products, with said pair of serving tongs usually being held with its front ends obliquely downwards, the pair of serving tongs cannot be inadvertently locked even if it is pressed into the closed position in order to firmly hold the food products grasped.

In a particularly preferred embodiment of the present invention, the elongated hole and the locking pin are completely covered by side parts of the second tong limb in a direction parallel to the pivot axis. By this means, the locking mechanism is completely "invisible" in a side view of the pair of serving tongs, and therefore the external appearance of the pair of serving tongs is not impaired by the presence of the locking mechanism.

Further features, properties and advantages of the invention are apparent from the attached, detailed description of a preferred exemplary embodiment together with the appended drawings, wherein:

BRIEF DESCRIPTION OF THE DRAWINGS

FIG. 5 is a plan view of the pair of serving tongs of FIG. 1; and

FIG. 6 shows a plan view of the open pair of serving tongs of FIG. 2.

DETAILED DESCRIPTION OF THE INVENTION

Figure 1:
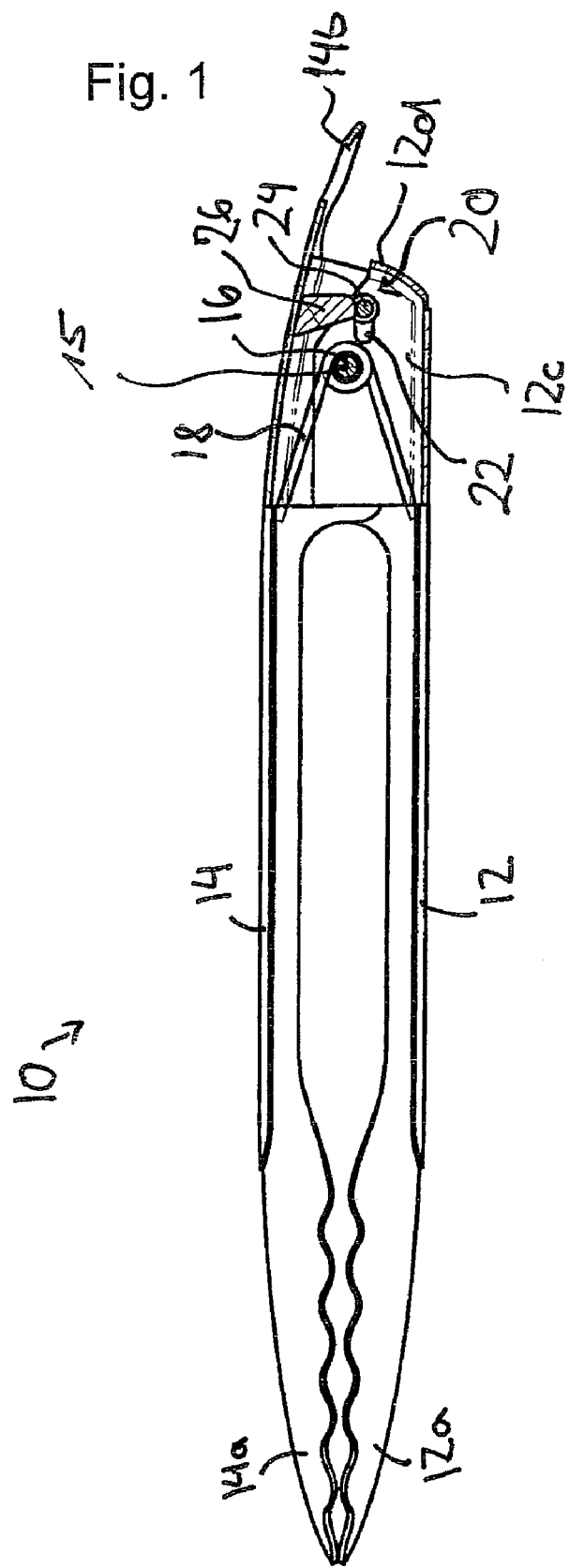
FIG. 1 shows a partial cross-sectional view (see the section profile I-I in FIG. 5) of a pair of serving tongs according to the invention in its closed position.

The pair of serving tongs 10 comprises a first tong limb 12 and a second tong limb 14 which are connected pivotably to each other by means of a pivot axis 15. In this case, the respective front ends 12a, 14a of the first and second tong limbs 12, 14 are designed for grasping food products, with it being possible, in addition to the gripper form in the manner of an oak leaf illustrated in FIGS. 1 to 6, for any design form customary for pairs of serving tongs, for example in the form of spoons, forks, spatulas or the like, to be provided. At the rear end of the second tong limb 14, an extended section 14b with an eye or the like can be provided, by means of which the pair of serving tongs can be hung up when not in use. The pivot axis 15 is formed separately from the two tong limbs 12, 14, runs in each case through a passage hole (not illustrated) in the side parts 12c, 14c of the two tong limbs 12, 14 and is defined by a pin 16 which is fixed against sliding out laterally by means of two rivet heads 16a, 16b on the tong limbs 12, 14.

Figure 2:
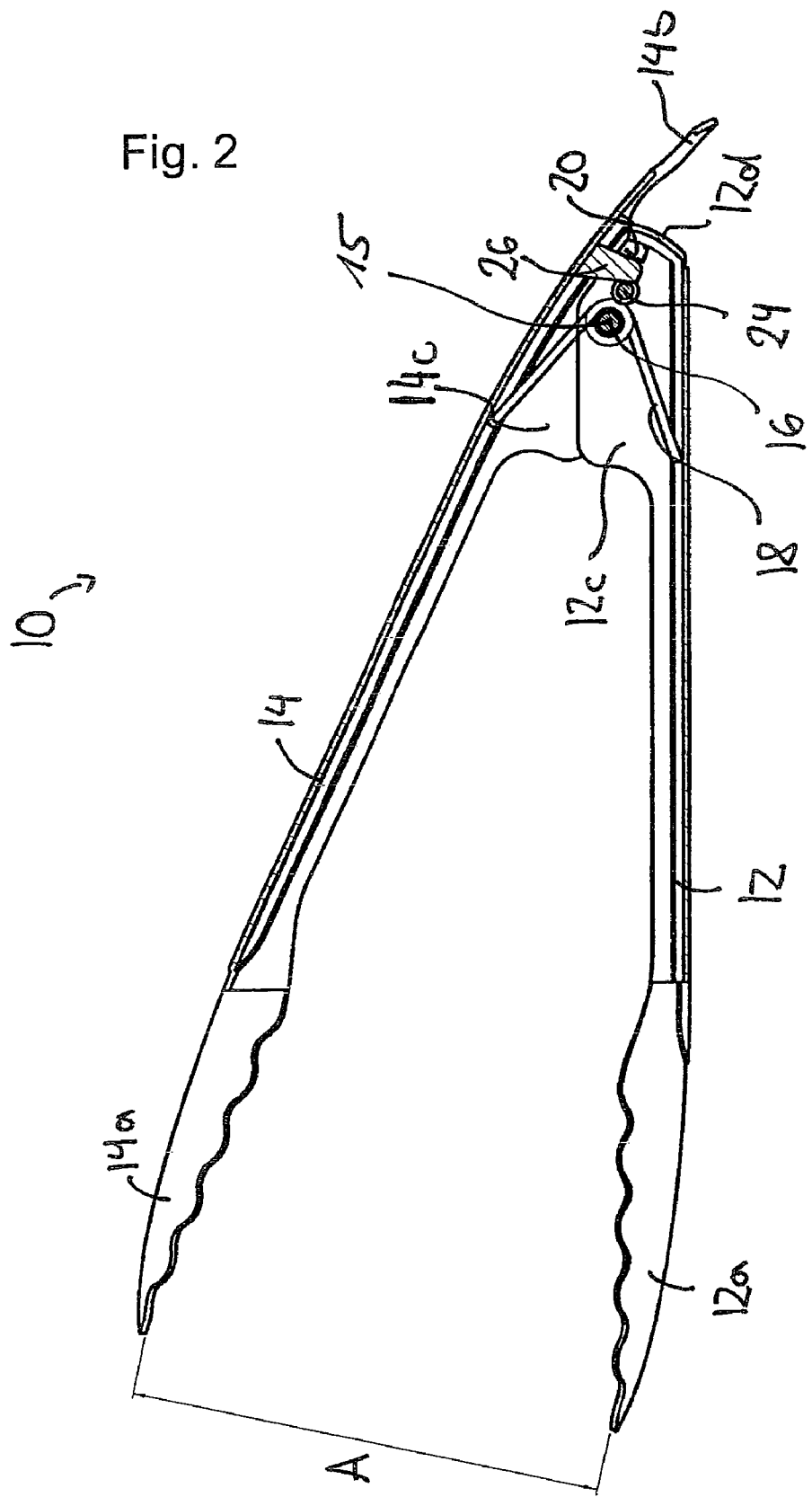
FIG. 2 shows a cross-sectional view (see the section profile II-II in FIG. 6) of the pair of serving tongs from FIG. 1 in its open position.
Figure 3:
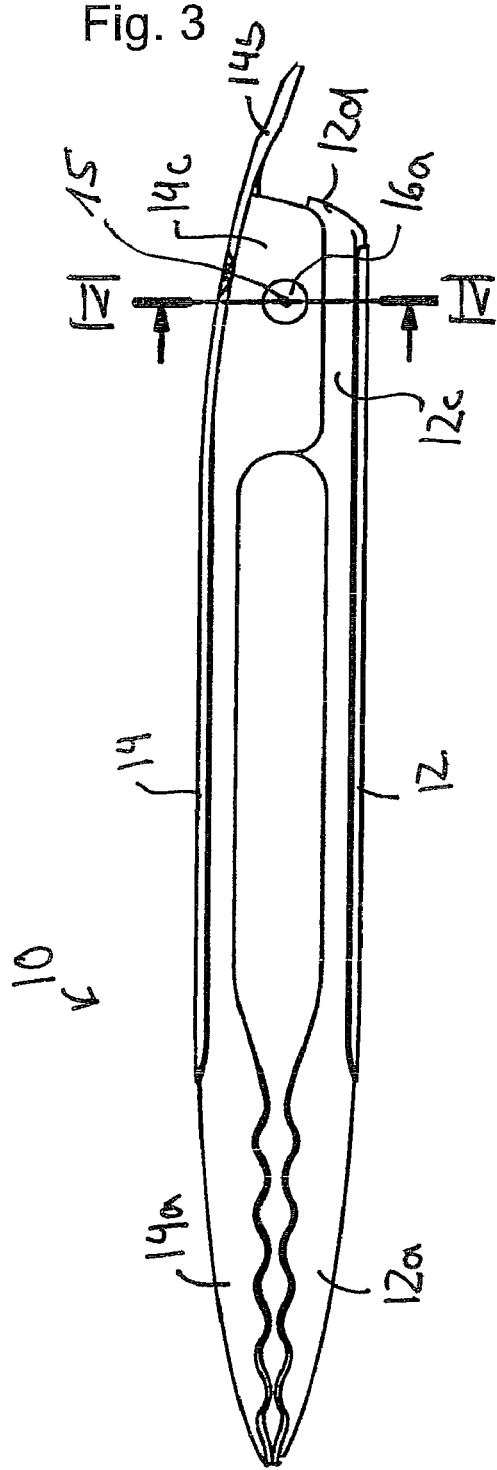
FIG. 3 is a side view of the pair of serving tongs in its closed position.
Figure 4:
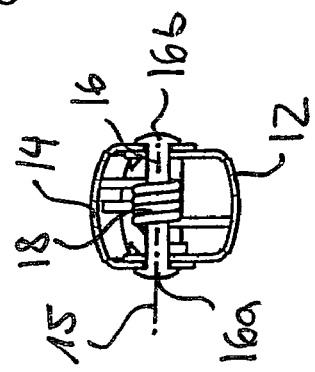
FIG. 4 shows a cross-sectional view along line IV-IV from FIG. 3.

As apparent in particular from FIG. 2, the rear region 12d of the side part 12c of the first tong limb 12 is designed in such a manner that, in the completely open position of the pair of serving tongs 10, it restricts the opening between the front ends 12a, 14a of the two tong limbs 12, 14 to a maximum opening width A.

A helical expanding spring 18 is arranged around the pivot-axis pin 16 and prestresses the tong limbs 12, 14 into the open position, illustrated in FIG. 2, of the pair of serving tongs 10. Between the two side parts 14c of the second tong limb 14, a locking mechanism, which is denoted in general by 20, is arranged on that side of the pivot axis 15 which faces away from the front ends 12a, 14a of the tong limbs 12, 14. The locking mechanism 20 comprises an elongated hole 22 which is formed in the side part 12c of the first tong limb 12 and runs parallel to a longitudinal axis of the first tong limb 12. A locking pin 24 is guided moveably in the elongated hole 22. Furthermore, a locking cam 26 is provided on that side of the second tong limb 14 which faces the first tong limb 12, said locking cam coming into contact with the locking pin 24 in the locking position, which is illustrated in FIG. 1, of the locking mechanism 20, and therefore, in this locking position, an opening of the pair of serving tongs 10 is prevented by the locking cam 26 being supported on the locking pin 24, with the locking pin 24, in the case of the example, being held frictionally in its locking position at the rear end of the elongated hole 22.

If the pair of serving tongs 10 in the locking position shown in FIG. 1 is now grasped by a user who slightly presses the two tong limbs 12, 14 together, the locking cam 26 is raised from the locking pin 24. If the pair of serving tongs 10 is then pivoted into a position in which the front ends 12a, 14a are located beneath the pivot axis 15, the locking pin 24 slides forwards under the effect of gravitational force in the elongated hole 22 into the release position which is illustrated in FIG. 2 and in which the tong limbs 12, 14 can be pivoted freely relative to each other and the pair of serving tongs 10 can therefore be pressed into the open position by the spring 18.

In order to lock the pair of serving tongs 10 again in the closed position after use, the user presses the two tong limbs 12, 14 together with one hand and pivots the pair of serving tongs 10 in such a manner that the front ends 12a, 14a of the tong limbs 12, 14 are located above the pivot axis 15. The locking pin 24 can then slide again in the elongated hole 22 under the action of gravitational force into the rear locking position which is illustrated in FIG. 1 and in which the locking cam 26 is supported on the locking pin 24 and therefore prevents the pair of serving tongs 10 from opening.

What is claimed is:

1. Pair of serving tongs (10), comprising:
   two tong limbs (12, 14) having front ends and rear ends which are connected to each other in a manner such that they can pivot relative to each other about a fixed pivot axis (15) and are designed at their front ends (12a, 14a) for grasping food products, a spring (18) in order to prestress the tong limbs (12, 14) into an open position of the pair of serving tongs (10), and a locking mechanism (20) arranged at their rear ends behind the pivot axis when viewed down a longitudinal axis of said tongs from said front ends in order to lock the tong limbs (12, 14) counter to the prestress of the spring (18) in a closed position of the pair of serving tongs (10),
   wherein the first tong limb (12) comprises an elongated hole (22) in which a locking pin (24) is moveably guided, and wherein a locking cam (26) is provided on the second tong limb (14) and, in the locked closed position of the pair of serving tongs (10), comes into contact with the locking pin (24), and wherein said locking pin slides under the action of gravitational force in said elongated hole when pivoted into an essentially vertical position with the tong limbs close to each other,
   wherein a locking of the tong limbs (12, 14) takes place by simple pivoting of the pair of serving tongs (10) into an essentially vertical position with the front ends of the tong limbs close to each other and pointing upwards and wherein unlocking of the tong limbs (12, 14) takes place by simple pivoting of the pair of serving tongs (10) into an essentially vertical position with the tong limbs close to each other and the front ends pointing downwards.

2. Pair of serving tongs (10) according to claim 1, characterized in that the elongated hole (22) extends essentially parallel to a longitudinal axis of the first tong limb (12).

3. Pair of serving tongs (10) according to claim 1, wherein the locking position of the locking pin (24) corresponds to a position at a rear end of the elongated hole (22) while the release position of the locking pin (24) corresponds to a position at a front end of the elongated hole (22), wherein said front end of the elongated hole is the portion of said elongated hole closest to said front ends (12a and 14a) and said rear end of the elongated hole is the portion of said elongated hole farthest from said front ends.

4. Pair of serving tongs (10) according to claim 1, characterized in that the elongated hole (22) and the locking pin (24) are completely covered by side parts (14c) of the second tong limb (14) in a direction parallel to the pivot axis (15).

5. Pair of serving tongs according to claim 1, wherein said elongated hole and said locking pin are completely covered by side parts of said second tong limb.

6. Pair of serving tongs according to claim 1, wherein said first tong limb comprises a rear region that restricts further opening of said front ends of the serving tongs in the open position by contacting said second tong limb.

* * * * *